United States Patent
Persson et al.

(10) Patent No.: US 12,434,746 B2
(45) Date of Patent: Oct. 7, 2025

(54) RAIL-GUIDED WAGON

(71) Applicant: TETRA LAVAL HOLDINGS & FINANCE S.A., Pully (CH)

(72) Inventors: Richard Persson, Häljarp (SE); Erland Annerfeldt, Hörby (SE); Mats Eriksson, Dalby (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 953 days.

(21) Appl. No.: 17/623,463

(22) PCT Filed: Jul. 2, 2020

(86) PCT No.: PCT/EP2020/068614
§ 371 (c)(1),
(2) Date: Dec. 28, 2021

(87) PCT Pub. No.: WO2021/004866
PCT Pub. Date: Jan. 14, 2021

(65) Prior Publication Data
US 2022/0348238 A1    Nov. 3, 2022

(30) Foreign Application Priority Data
Jul. 8, 2019 (EP) .................................... 19185028

(51) Int. Cl.
*B61J 3/00* (2006.01)
(52) U.S. Cl.
CPC ........................ *B61J 3/00* (2013.01)
(58) Field of Classification Search
CPC ..... B61J 3/00; B61B 3/00; B61B 3/02; B61B 10/00; B61B 10/02; B61B 10/022; B61B 13/04
See application file for complete search history.

(56) References Cited

U.S. PATENT DOCUMENTS

| | | | |
|---|---|---|---|
| 3,550,535 | A | 12/1970 | Rooklyn |
| 5,492,066 | A | 2/1996 | Nozaki et al. |
| 2017/0303717 | A1 | 10/2017 | Laniado et al. |
| 2020/0003257 | A1 | 1/2020 | Neufeld et al. |

FOREIGN PATENT DOCUMENTS

| | | | | |
|---|---|---|---|---|
| CN | 103204358 A | 7/2013 | | |
| CN | 107140394 A | 9/2017 | | |
| CN | 109720630 A | 5/2019 | | |
| DE | 102017108572 A1 | 10/2018 | | |
| EP | 3476773 A1 | * | 5/2019 | ............ B65G 19/02 |
| JP | H07156794 A | 6/1995 | | |

OTHER PUBLICATIONS

International Search Report (PCT/ISA/210) and Written Opinion (PCT/ISA/237) mailed on Oct. 7, 2020, by the European Patent Office as the International Searching Authority for International Application No. PCT/EP2020/068614. (10 pages).

\* cited by examiner

*Primary Examiner* — Robert J McCarry, Jr.
(74) *Attorney, Agent, or Firm* — BUCHANAN INGERSOLL & ROONEY PC

(57) ABSTRACT

A rail-guided wagon for transporting a carrier carrying a package in a form and seal machine is provided. The wagon comprises: a set of spaced-apart wheels to be distributed on each side of the rail, wherein a first subset of the wheels to be arranged on a first side of the rail is spring-biased towards a second subset of the wheels to be arranged on an opposite side of the rail.

16 Claims, 4 Drawing Sheets

RAIL-GUIDED WAGON

TECHNICAL FIELD

The invention relates to a rail-guided wagon, in particular for transporting a carrier carrying a semi-finished package, such as a food package, in a form and seal machine.

BACKGROUND ART

In the field of carton based packaging for food products, there are generally two main types of systems; roll fed systems and blanks fed systems. An example of a package formed by a roll fed system is Tetra Brik® marketed by Tetra Pak, and an example of a package formed by a blanks fed system is Tetra Recart® or Tetra Rex®, both marketed by Tetra Pak.

In the roll fed systems, a roll of packaging material is fed to the form and seal machine. The roll is shaped into a tube, which in turn is filled with a liquid food product. By successively making transversal sealings in the lower, filled part of the tube and subsequent cutting of the lower part of the tube, packages can be formed.

In the carton blanks fed systems, the packaging material is prepared before being fed to the system by cutting the packaging material into separate pieces or blanks, wherein each blank corresponds to the packaging material required to form one package, and by providing a longitudinal sealing such that each piece of packaging material is shaped into a sleeve-shaped capsule or tubular body. In order to facilitate folding, weakening lines may be provided in the packaging material.

In the form and seal machine for retortable, liquid or semi-solid or wet food, in so-called Tetra Recart® packages, the sleeve-shaped bodies of packaging material are placed in a magazine, usually in an upright position such that the openings are vertically aligned. A sleeve-shaped body of packaging material is fetched from the magazine, erected and placed in a cassette or carrier; the carrier ensures that the sleeve-shaped body of packaging material is kept in a position such that a rectangular cross section is formed. The rectangular sleeve will be positioned in the carrier during filling and forming of the package. Due to the high speed operation of the form and seal machine, the carriers are moving along a closed rail circuit. The sleeve-shaped bodies of packaging material are fetched at one position of the closed circuit, while filled packages are discharged from the carriers at a downstream position of the closed circuit. When a carrier is empty, it will eventually return to the fetching position to receive another sleeve-shaped body of packaging material.

The carrier is transported by means of a carrying wagon, to which the carrier is releasably connected. The wagon is driven along a rail in order to transport the carrier (and the associated sleeve-shaped body of packaging material) through various stations of the form and seal machine. A first station is configured to close and seal one end of the sleeve-shaped body of packaging material such that a package with an open end is formed. Next, the wagon transports the carrier through a second station in which the open end package is filled with a food product through the open end, and finally the wagon transports the carrier through a third station in which the open end of the package is sealed and closed. The package is then released from the carrier, and the package is moved further downstream in the form and seal machine by other means, such as conveyor belts, to the final folding station, where the packages attain their final shape.

The wagons are also arranged in a closed circuit. In a typical application, no less than 76 wagons are running along the closed circuit rail.

Each wagon is supported by four wheels engaging with the rail; two wheels on each side of the rail. Correct positioning of the wagons is of great importance; therefore it is important to control the pre-tension of the wheels towards the rail. If the wheels are pressed too tight against the rail, there is a risk that the entire form and seal machine will not start. On the other hand, if the pressing force of a wheels is too low, the wheel will sometimes slide, sometimes roll. This will lead to increased wear of the wheel/rail interface, which in turn leads to incorrect positioning of the wagon/carrier/package. One obvious consequence of incorrect positioning of the carriers and packages is that food may be filled also outside the packages.

In a form and seal machine of today, the operator must ensure correct biasing of the wheels of each wagon. In order to provide the ability to adjust the engagement of the wheels with the rail, the two wheels on one side of the rail are eccentrically supported on the wagon. By tightening these two wheels, the biasing of the wagon is adjusted.

However, when having 76 wagons there will be 152 wheels to adjust. This requires some amount of time, and it is not unusual to have a machine shut down several hours during wagon adjustment.

As machine down time is something that is highly undesired, and something that should be avoided, there is a need for an improved wagon.

SUMMARY

It is an object of the invention to at least partly overcome one or more of the above-identified limitations of the prior art. In particular, it is an object to provide a wagon which greatly reduces the amount of time needed for adjustment, and also reduces the risk of wear of the wagon and/or the associated rail.

To solve these objects a rail-guided wagon is provided. The wagon, which is configured to transport a carrier in a package form and seal machine, comprises a set of spaced-apart wheels to be distributed on each side of the rail, wherein a first subset of the wheels to be arranged on a first side of the rail is spring-biased towards a second subset of the wheels to be arranged on an opposite side of the rail.

The wagon is advantageous in that automatic biasing of the wheels towards the rail is accomplished, thereby entirely removing the need for manual adjustment.

The first subset of wheels may include two wheels, which is advantageous in that improved guidance of the wagon along the rail is accomplished, compared to if the first subset would comprise only one wheel.

In an embodiment, the wheels of the first subset are spaced apart in the longitudinal direction of the rail. This will prevent any tilting of the wagon relative the rail.

Each wheel of the first subset may be independently supported by the wagon. This is advantageous in that each wheel will be allowed to move separately from any movement of any other wheel; thereby it is possible to accommodate for tolerance differences etc.

In an embodiment, the position of the second subset of the wheels is fixed. A stationary reference is thereby accomplished, especially for the movable wheel(s) of the first subset.

Each wheel of the first subset of wheels may be rotationally supported by a wheel support member being pivotally connected to the wagon. A robust mounting of the wheel(s) is thereby accomplished.

In an embodiment, the wheel support member is pivotally connected to the wagon at a pivot joint being remote from a rotational axis of the associated wheel. An eccentric movement of the wheel(s) is thereby provided for, which is not only a very reliable solution in order to apply the biasing force towards the rail, but also creates additional space to accommodate the entire spring biasing mechanism for the first subset of wheels.

The pivot joint may be arranged at a distance, in the longitudinal direction of the rail, from the rotational axis of the associated wheel. The biasing force will then be acting on a lever arm.

The pivot joint may extend in a direction being parallel with the rotational axis of the associated wheel. Increased robustness is thereby achieved.

In an embodiment the pivot joint is rotationally journaled at its respective ends. This provides for a very torsional stiff and robust mounting, as there is a relatively large distance between the journaling positions.

The wagon may further comprise a lock member being configured to secure the position of the wheel support member relative the wagon. This facilitates mounting of the wagon to the rail, and also ensures that the wagon is located at the rail even when the biasing force is removed.

Each wheel may be arranged to rotate in a horizontal plane when in use. The wagon may further comprise a spring being arranged to bias the first subset of the wheels towards the second subset of the wheels.

A common spring may be provided to bias all wheels of the first subset of wheels. A reduced number of components is thereby used, and it also ensures that the same biasing force is applied to all wheels of the first subset.

According to a second aspect, a form and seal machine is provided. The form and seal machine comprises at least one rail-guided wagon according to the first aspect.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
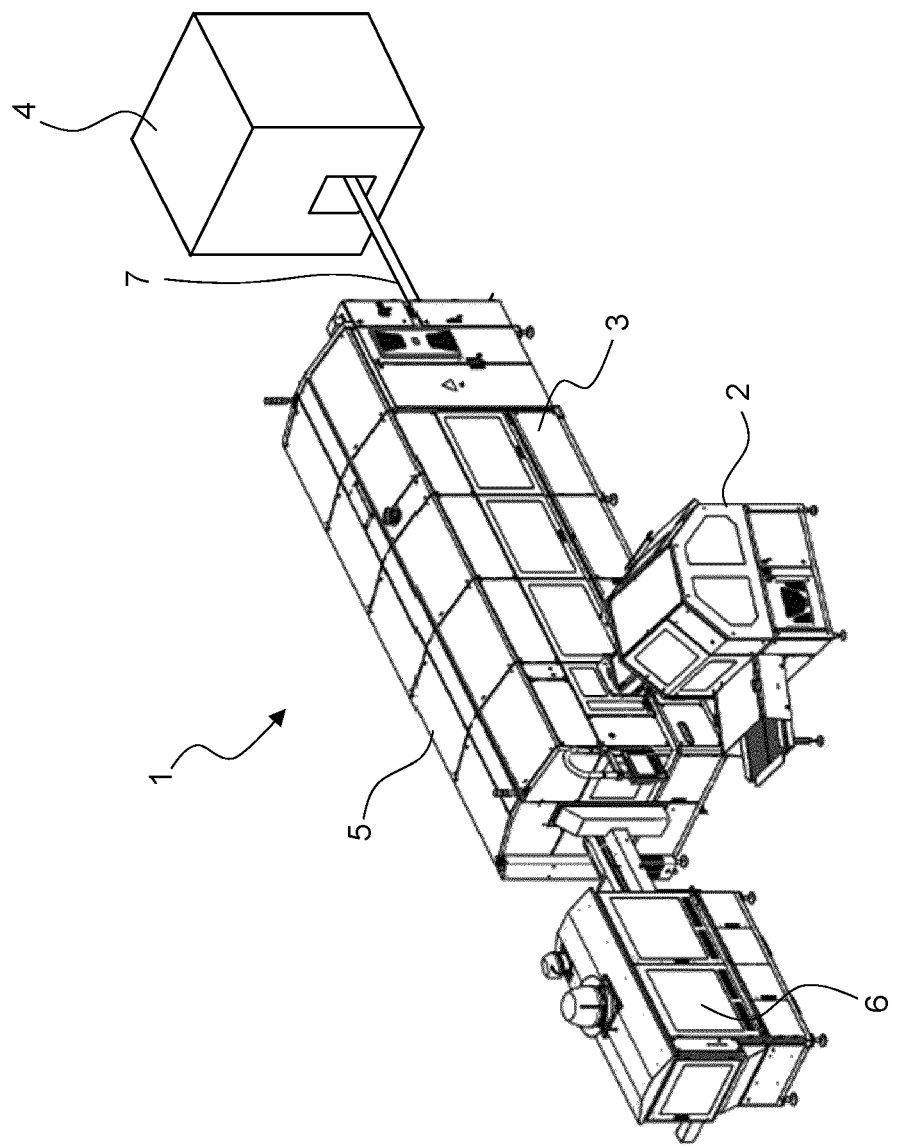
FIG. 1 is an isometric view of a form and seal machine according to an embodiment.

With reference to FIG. 1 an example of a form and seal machine 1 is illustrated. The form and seal machine 1 is of the carton blanks-fed system type as described in the background section, i.e. fed with sleeve-shaped bodies formed from pre-cut carton blanks. In order to form and seal packages from the sleeve-shaped bodies of packaging material, the form and seal machine 1 is divided into five different stations. An infeed station 2 is configured to load the flat sleeve-shaped bodies of packaging material, and to feed the sleeve-shaped bodies of packaging material into a first sealing station 3. The first sealing station 3 is configured to seal one end of an erected sleeve-shaped body, such that the semi-finished package can be filled with the intended product. Filling is achieved by means of a filling station 4, which can be of a rotary type being commercially available and which is connected to the upstream sealing station 3 by means of one or more conveyors 7, or other suitable means for transporting the semi-finished packages to and from the filling station 4. After filling, the semi-finished packages are transported to a second sealing station 5 which is configured to seal the open end of the package. A final forming station 6 receives the filled and sealed packages, and provides the final forming; e.g., folding the sealed ends resulting in a rectangular shaped package.

During transportation through (or between) the stations 2-5 described above, each semi-finished package is carried by a carrier, which in turn is driven by a rail-guided wagon.

Figure 2:
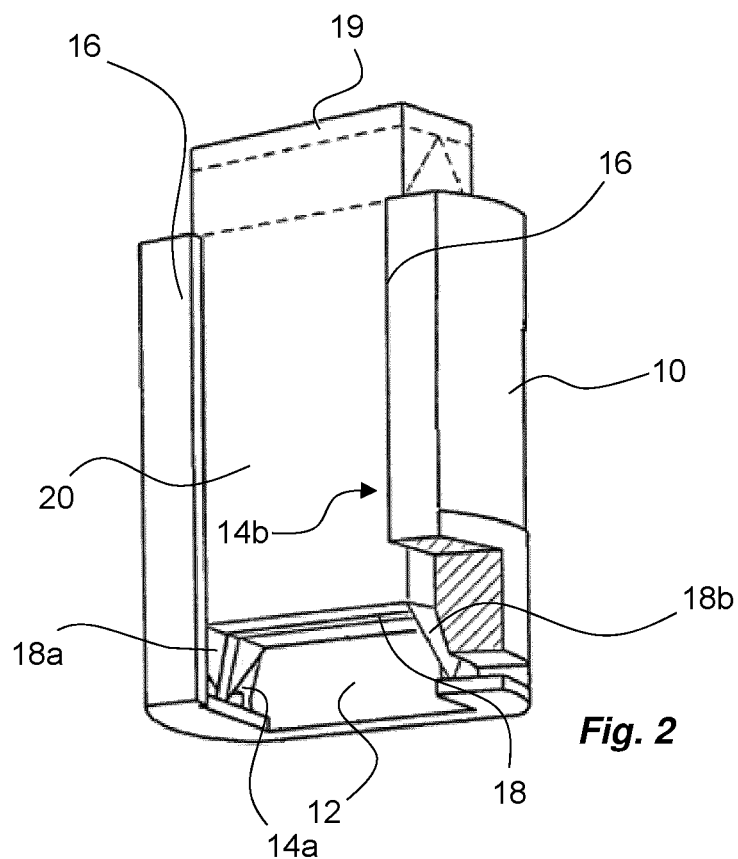
FIG. 2 is an isometric view of a carrier to be carried by a wagon according to an embodiment.

Turning to FIG. 2, a carrier 10 is shown. The carrier 10 has an inner wall 12 and two side walls 14*a-b* extending out from the inner wall 12. Each side wall 14*a-b* has a projection 16 extending perpendicularly towards the opposite side wall 14*a-b*; the projection 16 is arranged at the distal end of the respective side wall 14*a-b* in order to prevent a carried package 20 to fall out from the carrier 10.

The inner wall 12 and the side walls 14*a-b* define the shape of the package 20 to be formed. As can be seen in FIG. 2, the package 20 has its lower end 18 sealed and semi-formed, such that the package 20 is standing on two opposite flaps 18*a-b*, and extends upwards in a rectangular shape. The lower sealed end 18 is in fact the top end of the final package, which means that the still open end 19 of the package 20 will eventually form the bottom end of the package 20.

With reference to the form and seal machine 1 of FIG. 1, the package 20 carried by the carrier 10 in FIG. 2 has a shape and configuration corresponding to a position immediately before, during, or immediately after the filling station 4.

In order to guide the package 20 through the form and seal machine 1, the carrier 10 can be attached to a wagon 100. An example of a wagon 100 suitable for this purpose is shown in FIGS. 3-6.

Figure 3:
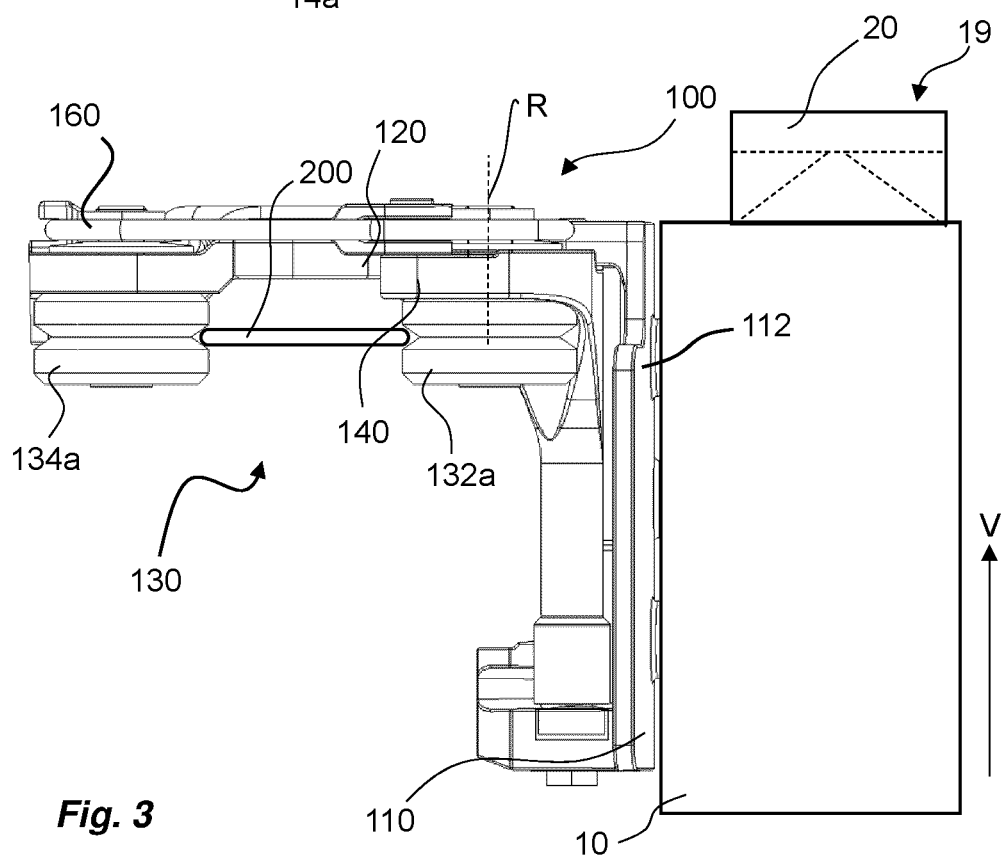
FIG. 3 is a side view of a rail-guided wagon according to an embodiment.

Starting with reference to FIG. 3, the wagon 100 is configured to be guided by a rail 200. During use, the rail 200 is extending essentially in a horizontal plane. The wagon 100 has a connection surface 110 which extends in a vertical direction V; the connection surface 110 is designed and dimensioned to be in contact with a rear side (outside surface) of the inner wall 12 of the carrier 10.

The connection surface 110 has an upper portion 112 which is connected to a support body 120. The support body 120 extends essentially perpendicular to the connection surface 110, 112 i.e. in the same plane as the rail 200. The support body 120 has a fixed position relative the connection surface 110, and the wagon 100 is configured to support a set of spaced-apart guiding wheels 130. The guiding wheels 130 are distributed on each side of the rail 200, and comprises a first subset of guiding wheels 132*a-b* and a second subset of guiding wheels 134*a-b*.

The first subset of wheels 132*a-b* is arranged on a first side of the rail 200, while the second subset of wheels 134*a-b* is arranged on an opposite side of the rail 200.

The second subset of guiding wheels 134a-b is supported by the support body 120, and the second subset of guiding wheels 134a-b comprises one or more fixed guiding wheels 134a-b. The guiding wheels 134a-b, which are free to rotate relative to the support body 120 (but are otherwise fixed in position relative the support body 120) are arranged on the same side of the rail 200.

The first subset of wheels 132a-b are arranged on the same side of the rail 200 but opposite the side of the second subset of wheels 134a-b. Instead of having a fixed position, the first subset of wheels 132a-b are spring biased towards the second subset of wheels 134a-b such that the rail 200 is clamped between the first and second subset of wheels 132a-b, 134a-b. In order to achieve this, the first subset of wheels 132a-b is not supported by the support body 120, but instead by one or more wheel support members 140. Each wheel support member 140 is pivotally connected to the wagon 100; to the connection surface 110, and/or to the support body 120.

Figure 4:
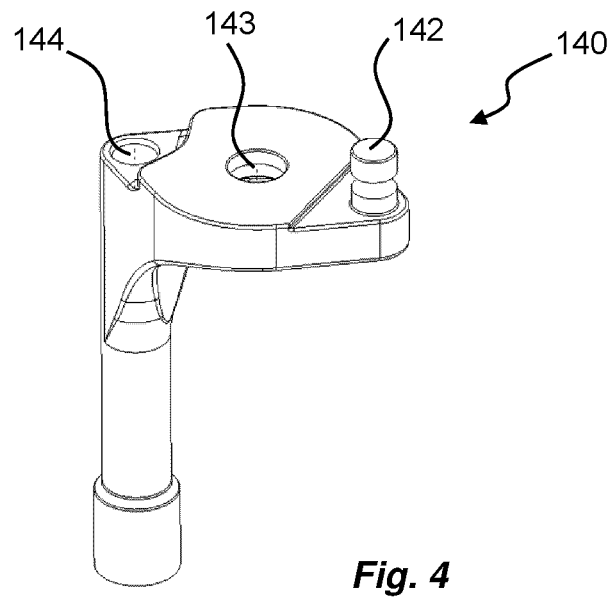
FIG. 4 is an isometric view of parts of the rail-guided wagon shown in FIG. 3.

The wheel support member 140 is shown in further detail in FIG. 4. Each wheel support member 140 is provided with a vertical projection 142 for engagement with a spring 160, a bore 143 for supporting the wheel 132a (see FIG. 3), and a hollow shaft 144 supported by a rod-like member 150 (see FIG. 5), which forms a rotational support for the wheel support member 140. The shaft 144 extends along the major part of the connection surface 110 of the wagon 100, in a direction being essentially parallel with the rotational axis R of the associated wheel 132a (see FIG. 3). The hollow shaft 144 encloses the rod-like member 150 which is attached to the connection surface 110, 112 at its respective ends, thereby allowing the entire wheel support member 140 to be rotationally journaled.

The rod-like member 150, and thereby the shaft 144 of the wheel support member 140, is further arranged at a distance from the rotational axis R of the associated wheel 132a-b, in the longitudinal direction of the rail 200.

Figure 5:
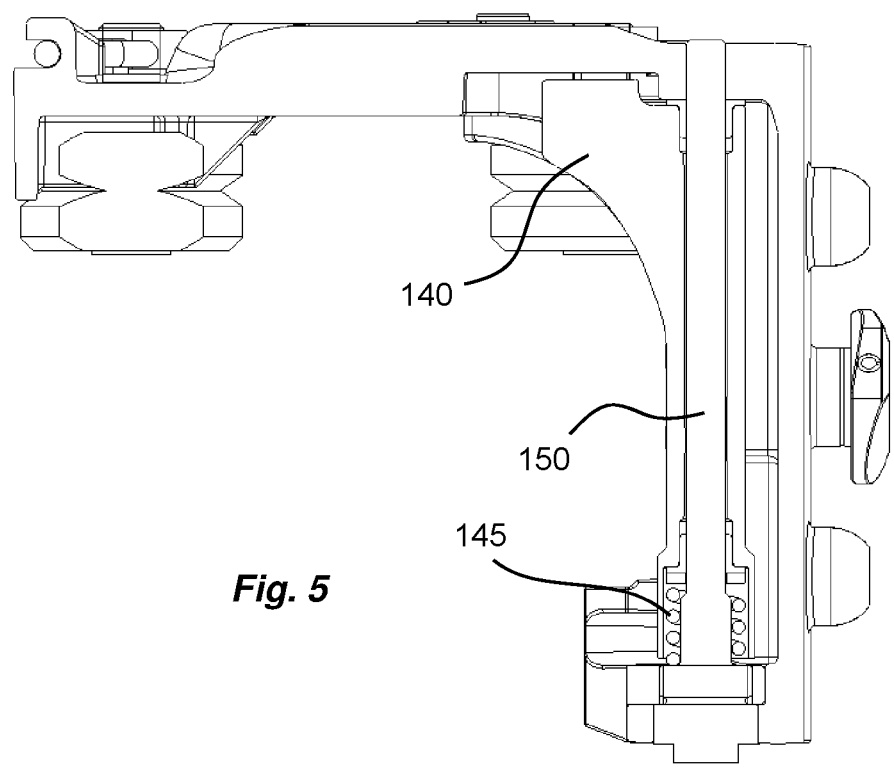
FIG. 5 is a cross-sectional view of the rail-guided wagon shown in FIG. 3.

Further details of the wheel support member 140, and its attachment to the wagon 100, are shown in FIG. 5. The rod-like member 150 is fixedly attached to the wagon 100; at the upper end, as well as to the bottom end. The wheel support member 140 is mounted on the rod-like member 150, along its entire length. A spring 145 urges the wheel support member 140 upwards, in the vertical direction V (see FIG. 3). As the wheel support member 140 is guided by the longitudinally extended rod-like member 150, a very stiff connection is obtained, preventing the wheel support member 140 from tilting away from its vertical alignment. For such stiff connection to be realized, it is required to allow the shaft 144 to extend along the rod-like member 150 for a certain length. In a preferred embodiment, the length of the hollow shaft 144 enclosing the rod-like member 150 is at least 5 cm, such as from 6 to 12 cm, such as from 8 to 12 cm.

Now turning to FIG. 6, further details of the wagon 100 will be described. As is clearly shown in FIG. 6, the rail 200 is arranged in between the first subset of wheels 132a-b and the second subset of wheels 134a-b. Each wheel 132a-b of the first subset is allowed to pivot by means of the pivot joint formed by the hollow shaft 144 enclosing the rod-like member 150, which pivot joint is arranged at a distance from the rotational axis R of the associated wheel 132a-b (see FIG. 3). This means that each wheel 132a-b of the first subset can be positioned in close contact with the rail 200.

In the described embodiment, such motion is accomplished by a spring 160. The spring 160 is in the embodiment in the form of a metal wire, being bent to a curved shape as illustrated in FIG. 6. The spring 160 is arranged above the support body 120, preferably in a horizontal plane. A first end of the spring 160 engages with the leading wheel support member 140, while the other end of the spring 160 engages with the trailing wheel support member 140. For this, each wheel support member 140 is provided with its vertical projection 142. In the shown embodiment, the spring 160 acts on each wheel support member 140 individually, meaning that each wheel support member 140 can move without changing the position of the other wheel support member 140.

The support body 120 is further provided with a plurality of steering pins 122 in order to fixate the position of the spring 160.

The idle shape of the spring 160 is somewhat smaller than horizontal distance between the two opposite vertical projections 142 of the respective wheel support members 140, such that expansion of the spring 160 is required in order to position the spring 160 around the projections 142. Hence, the spring 160 will urge the projections 142 towards each other, causing the respective wheel support members 140 to pivot and thereby moving the wheels 132a-b of the first subset towards the rail 200. In a typical application, the spring force will be in the range of 25-75 N, such as 50-60 N.

Figure 6:
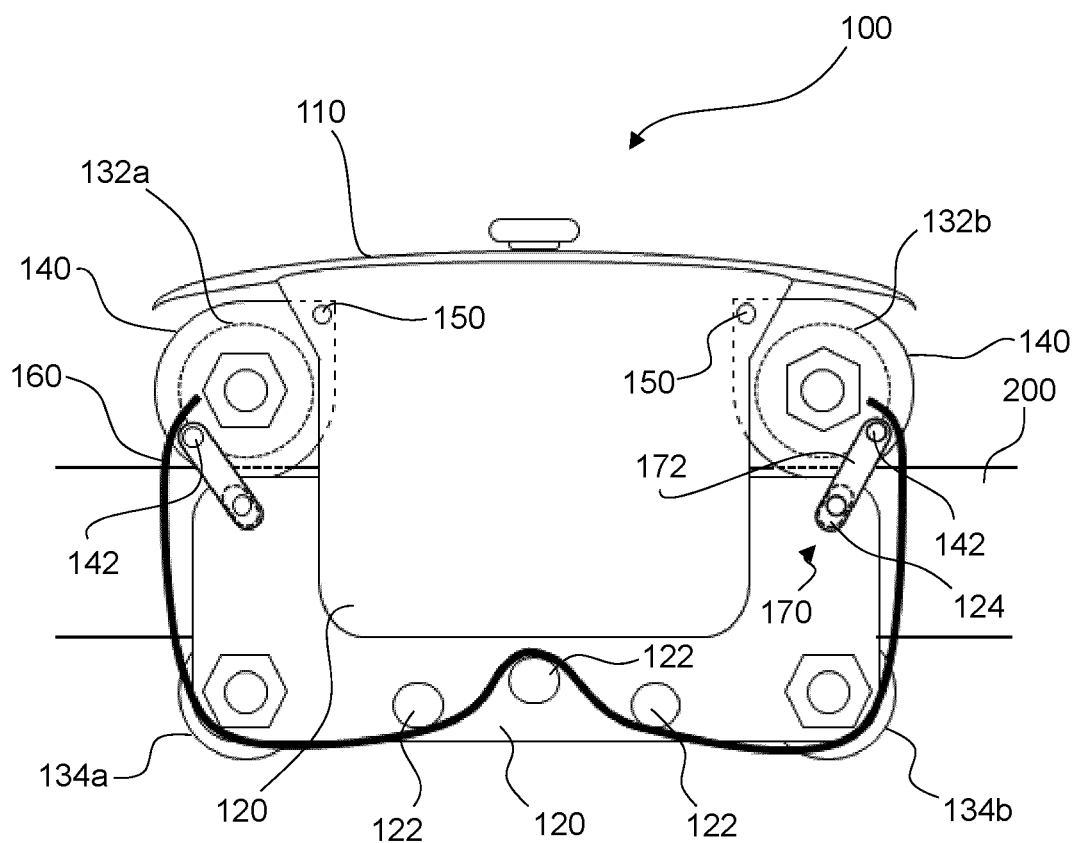
FIG. 6 is a top view of the rail-guided wagon shown in FIG. 3.

As can be seen in FIG. 6, the vertical projection 142 of the wheel support member 140 also forms part of a lock member 170. The lock member 170 is configured to secure the position of the wheel support member 140 relative the wagon 100, i.e. relative the support body 120. In the shown embodiment, the lock member 170 comprises the vertical projection 142 of the wheel support member 140, a vertical recess 124 of the support body 120, and a connecting member 172 having a recess to engage with the vertical projection 142 and a projecting pin to engage with recess 124. The recess 124 of the support body 120 is preferably oblong, and substantially larger than the projecting pin of the connecting member 172. A relative, but limited, movement between the wheel support member 140 and the support body 120 is thereby allowed.

In the described embodiment, the wagon 100 is provided with a set of four guiding wheels 132a-b, 134a-b. It should however be realized that the wagon may be provided with another number of wheels, the exact number being selected depending on the particular application. For example, in some embodiments it may be sufficient to only have one wheel on each side of the rail 200, while other embodiments require three or more wheels on one side of the rail 200.

Other means for applying the spring force to the first subset of wheels 132a-b may also be considered, and used for certain embodiments. For example, each wheel support member 140 could be connected to its own spring pulling the wheel support member 140 towards the rail 200. Independent biasing of the wheel support members 140 would thereby be achieved. In another embodiment, a single spring could be connected to both wheel support members 140 and configured to pull the wheel support members 140 towards each other, without any connection to the support body 120.

From the description above follows that, although various embodiments of the invention have been described and shown, the invention is not restricted thereto, but may also be embodied in other ways within the scope of the subject-matter defined in the following claims.

The invention claimed is:

1. A rail-guided wagon for transporting a carrier in a package form and seal machine, comprising:
   a wagon body;
   a set of spaced-apart wheels to be distributed on each side of the rail, including a first subset of the wheels to be arranged on a first side of the rail and a second subset of the wheels to be arranged on an opposite side of the rail, wherein each wheel is arranged to rotate in a horizontal plane when in use;
   at least one wheel support member pivotally connected to the wagon body and configured to rotationally support each wheel of the first subset of the wheels, while biasing the first subset of the wheels toward the second subset of the wheels; and
   at least one spring arranged to urge the at least one wheel support member in an upward direction perpendicular to the horizontal plane.

2. The rail-guided wagon according to claim 1, wherein the first subset of wheels includes two wheels.

3. The rail-guided wagon according to claim 1, wherein the wheels of the first subset are spaced apart in a longitudinal direction of the rail.

4. The rail-guided wagon according to claim 2, wherein each wheel of the first subset is independently supported by the wagon body.

5. The rail-guided wagon according to claim 1, wherein a position of the second subset of the wheels is fixed.

6. The rail-guided wagon according to claim 1, wherein the at least one wheel support member is pivotally connected to the wagon body at a respective pivot joint that is remote from a rotational axis of an associated wheel.

7. The rail-guided wagon according to claim 6, wherein the respective pivot joint is arranged at a distance, in a longitudinal direction of the rail, from the rotational axis of the associated wheel.

8. The rail-guided wagon according to claim 6, wherein the respective pivot joint is formed by a hollow shaft of the at least one wheel support member, said hollow shaft enclosing a rod-like member that is fixedly attached to the wagon body.

9. The rail-guided wagon according to claim 8, wherein the rod-like member, as well as the hollow shaft, extends in a direction that is parallel with the rotational axis of the associated wheel.

10. The rail-guided wagon according to claim 9, wherein the rod-like member is fixed to the wagon body at its respective ends.

11. The rail-guided wagon according to claim 9, wherein the length of the hollow shaft enclosing the rod-like member is at least 5 cm.

12. The rail-guided wagon according to claim 9, wherein the length of the hollow shaft enclosing the rod-like member is from 8 to 12 cm.

13. The rail-guided wagon according to claim 1, further comprising a lock member that is configured to secure the position of the at least one wheel support member relative the wagon body.

14. The rail-guided wagon according to claim 1, wherein a common spring provides a biasing force to cause the at least one wheel supporting member to bias all wheels of the first subset of wheels.

15. A form and seal machine, comprising at least one rail-guided wagon according to claim 1.

16. A rail-guided wagon for transporting a carrier in a package form and seal machine, comprising:
   a set of spaced-apart wheels to be distributed on each side of the rail, wherein a first subset of the wheels to be arranged on a first side of the rail is spring-biased towards a second subset of the wheels to be arranged on an opposite side of the rail,
   further comprising a spring being arranged to bias the first subset of the wheels towards the second subset of the wheels,
   wherein each wheel of the first subset of wheels is rotationally supported by a wheel support member being pivotally connected to the wagon,
   the wheel support member is pivotally connected to the wagon at a pivot joint being remote from a rotational axis of the associated wheel,
   the pivot joint is formed by a hollow shaft of the wheel support member, said hollow shaft enclosing a rod-like member being fixedly attached to the wagon,
   the rod-like member, as well as the hollow shaft, extends in a direction being parallel with the rotational axis of the associated wheel, and
   the rod-like member is fixed to the wagon at its respective ends, and
   wherein a spring urges the wheel support member upwards, in the vertical direction.

* * * * *